(12) United States Patent
Aronowitz

(10) Patent No.: US 10,936,708 B2
(45) Date of Patent: Mar. 2, 2021

(54) BIOMETRIC DATA PROTECTION

(71) Applicant: International Business Machines Corporation, Armonk, NY (US)

(72) Inventor: Hagai Aronowitz, Modiin (IL)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 16/148,088

(22) Filed: Oct. 1, 2018

(65) Prior Publication Data

US 2020/0104472 A1     Apr. 2, 2020

(51) Int. Cl.
*G06F 21/32*     (2013.01)
*G06F 11/10*     (2006.01)
*G06F 16/22*     (2019.01)

(52) U.S. Cl.
CPC .......... *G06F 21/32* (2013.01); *G06F 11/1044* (2013.01); *G06F 16/2255* (2019.01)

(58) Field of Classification Search
CPC .. G06F 21/32; G06F 16/2255; G06F 11/1044; H04L 1/00
See application file for complete search history.

(56) References Cited

U.S. PATENT DOCUMENTS

| | | | | |
|---|---|---|---|---|
| 7,474,769 B1 * | 1/2009 | McAfee, II | ........ | G06K 9/00087 348/E7.056 |
| 7,711,152 B1 * | 5/2010 | Davida | ................... | G06F 21/32 382/115 |
| 7,797,549 B2 | 9/2010 | Main et al. | | |
| 8,429,232 B1 * | 4/2013 | Appenzeller | ........... | H04L 51/12 709/206 |
| 8,868,923 B1 * | 10/2014 | Hamlet | ................. | H04N 1/442 713/186 |
| 9,047,214 B1 * | 6/2015 | Northcott | ............ | G06F 11/1012 |
| 9,948,324 B1 * | 4/2018 | Havemose | .......... | G06F 11/1076 |

(Continued)

FOREIGN PATENT DOCUMENTS

WO     02/095657 A2     11/2002

OTHER PUBLICATIONS

Armoogum et al., "A practical approach for secure biometric template storage for authentication," 2016 IEEE International Conference on Emerging Technologies and Innovative Business Practices for the Transformation of Societies (EmergiTech), Aug. 2016, pp. 1-5, IEEE. DOI: 10.1109/EmergiTech.2016.7737333.

(Continued)

*Primary Examiner* — Aravind K Moorthy
(74) *Attorney, Agent, or Firm* — James L. Olsen

(57) ABSTRACT

Aspects of the present disclosure relate to enhancing biometric security. A biometric template and a biometric sample can be compared using a first security technique having a first ECC framework with a first number of codewords. A determination can be made that the biometric template and biometric sample do not match using the first security technique. The biometric template and the biometric sample can then be compared using a second security technique having a second ECC framework with a second number of codewords, the second number of codewords less than the first number of codewords. A determination can then be made that the biometric template and the biometric sample match, and a user associated with the biometric sample can be verified.

20 Claims, 7 Drawing Sheets

(56) References Cited

U.S. PATENT DOCUMENTS

| | | | |
|---|---|---|---|
| 2002/0069102 A1* | 6/2002 | Vellante | G06Q 10/06312 |
| | | | 705/7.22 |
| 2005/0018851 A1* | 1/2005 | Venkatesan | H04L 9/3257 |
| | | | 380/277 |
| 2006/0034497 A1* | 2/2006 | Manansala | G06K 9/001 |
| | | | 382/124 |
| 2007/0183632 A1* | 8/2007 | Bringer | G06F 21/6254 |
| | | | 382/115 |
| 2007/0209064 A1* | 9/2007 | Qin | G06F 21/6209 |
| | | | 726/5 |
| 2008/0199041 A1* | 8/2008 | Van Der Veen | G07C 9/37 |
| | | | 382/100 |
| 2010/0017618 A1* | 1/2010 | Golic | G06K 9/00288 |
| | | | 713/186 |
| 2010/0162072 A1* | 6/2010 | Chabanne | H04L 9/3236 |
| | | | 714/752 |
| 2010/0306550 A1* | 12/2010 | Kevenaar | G06F 21/32 |
| | | | 713/186 |
| 2011/0302420 A1* | 12/2011 | Davida | G06F 21/32 |
| | | | 713/180 |
| 2013/0230216 A1 | 9/2013 | Silvester | |
| 2013/0290732 A1* | 10/2013 | Branton | H04L 9/0863 |
| | | | 713/189 |
| 2014/0337682 A1* | 11/2014 | Prodan | H03M 13/116 |
| | | | 714/755 |
| 2015/0002704 A1* | 1/2015 | Vidal-Naquet | G06T 5/50 |
| | | | 348/241 |
| 2015/0003686 A1* | 1/2015 | Xiong | G06T 7/248 |
| | | | 382/107 |
| 2015/0294339 A1* | 10/2015 | Vargas | G06Q 20/405 |
| | | | 705/14.17 |
| 2016/0105277 A1* | 4/2016 | Isshiki | H04L 9/3231 |
| | | | 380/28 |
| 2016/0269178 A1 | 9/2016 | Yang et al. | |
| 2016/0299813 A1* | 10/2016 | Seol | G06F 3/0679 |
| 2017/0085379 A1* | 3/2017 | Mandal | H04L 9/304 |
| 2017/0093576 A1* | 3/2017 | Linnartz | H03M 13/63 |
| 2017/0272102 A1* | 9/2017 | Goldenberg | G06F 11/1012 |
| 2019/0163764 A1* | 5/2019 | Ioannou | G06F 3/067 |
| 2019/0212986 A1* | 7/2019 | Araki | G06F 7/4824 |
| 2019/0222570 A1* | 7/2019 | Krishan | G06F 21/35 |
| 2020/0053077 A1* | 2/2020 | Merrell | G06Q 20/40145 |
| 2020/0089978 A1* | 3/2020 | Ashdown | G06F 16/29 |
| 2020/0151419 A1* | 5/2020 | Hansen | G06K 9/036 |

OTHER PUBLICATIONS

Langkemper, S., "Strengthening password hashes by brute-forcing random data," Dec. 15, 2016, pp. 1-5. https://www.sjoerdlangkemper.nl/2016/12/15/using-secret-salts-in-password-hashes/.

Liu et al., "A Hybrid Approach to Protect Palmprint Templates," The Scientific World Journal, vol. 2014 (2014), Article ID 686754, Published Mar. 27, 2014, pp. 1-12. http://dx.doi.org/10.1155/2014/686754.

Juels et al., "A Fuzzy Commitment Scheme," CCS '99: Proceedings of the 6th ACM Conference on Computer and Communications Security, Nov. 1999, pp. 28-36, ACM. DOI: 10..1145/319709.319714.

Juels et al., "A Fuzzy Commitment Scheme," Sep. 25, 2013, pp. 1-21. https://www.google.co.il/url?sa=t&rct=j&q=&esrc=s&source=web&cd=1&ved=0ahUKEwj4mve3ycfWAhVFCpoKHXM0B4QQFgguMAA&url=http%3A%2F%2Fwww.arijuels.com%2Fwp-content%2Fuploads%2F2013%2F09%2FJW99.pdf&usg=AFQjCNFh7_w_L01L_-d_u200uZ-ln5YP-w.

Wikipedia, "Key stretching," Wikipedia the Free Encyclopedia, last edited on Mar. 26, 2018, printed Mar. 28, 2018, pp. 1-4, https://en.wikipedia.org/wiki/Key_stretching.

Wikipedia, "Pepper (cryptography)," Wikipedia the Free Encyclopedia, last edited on Feb. 14, 2018, printed Mar. 28, 2018, p. 1, https://en.wikipedia.org/wiki/Pepper_(cryptography).

Mell et al., "The NIST Definition of Cloud Computing", Recommendations of the National Institute of Standards and Technology, Sep. 2011, 7 pages.

* cited by examiner

BIOMETRIC DATA PROTECTION

BACKGROUND

The present disclosure relates generally to the field of security, and more particularly to securing biometric samples.

Passwords are a common method to authenticate users. A typical password includes alphanumeric characters that are validated in order to permit a user to access one or more computer resources. Passwords are used during log-in processes, to facilitate access to computer resources such as accounts, databases, networks, websites, and/or applications. Recently, biometric authentication has become increasingly popular as opposed to, or in addition to, alphanumeric passwords. Biometric authentication relies on unique biological characteristics (e.g., iris patterns, fingerprints, facial shapes, etc.) to verify users.

SUMMARY

Embodiments of the present disclosure relate to a method, system, and computer program product for enhancing biometric security. A biometric template and a biometric sample can be compared using a first security technique having a first error correcting code (ECC) framework with a first number of codewords. A determination can be made that the biometric template and biometric sample do not match using the first security technique. The biometric template and the biometric sample can then be compared using a second security technique having a second ECC framework with a second number of codewords, the second number of codewords less than the first number of codewords. A determination can then be made that the biometric template and the biometric sample match, and a user associated with the biometric sample can be verified.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
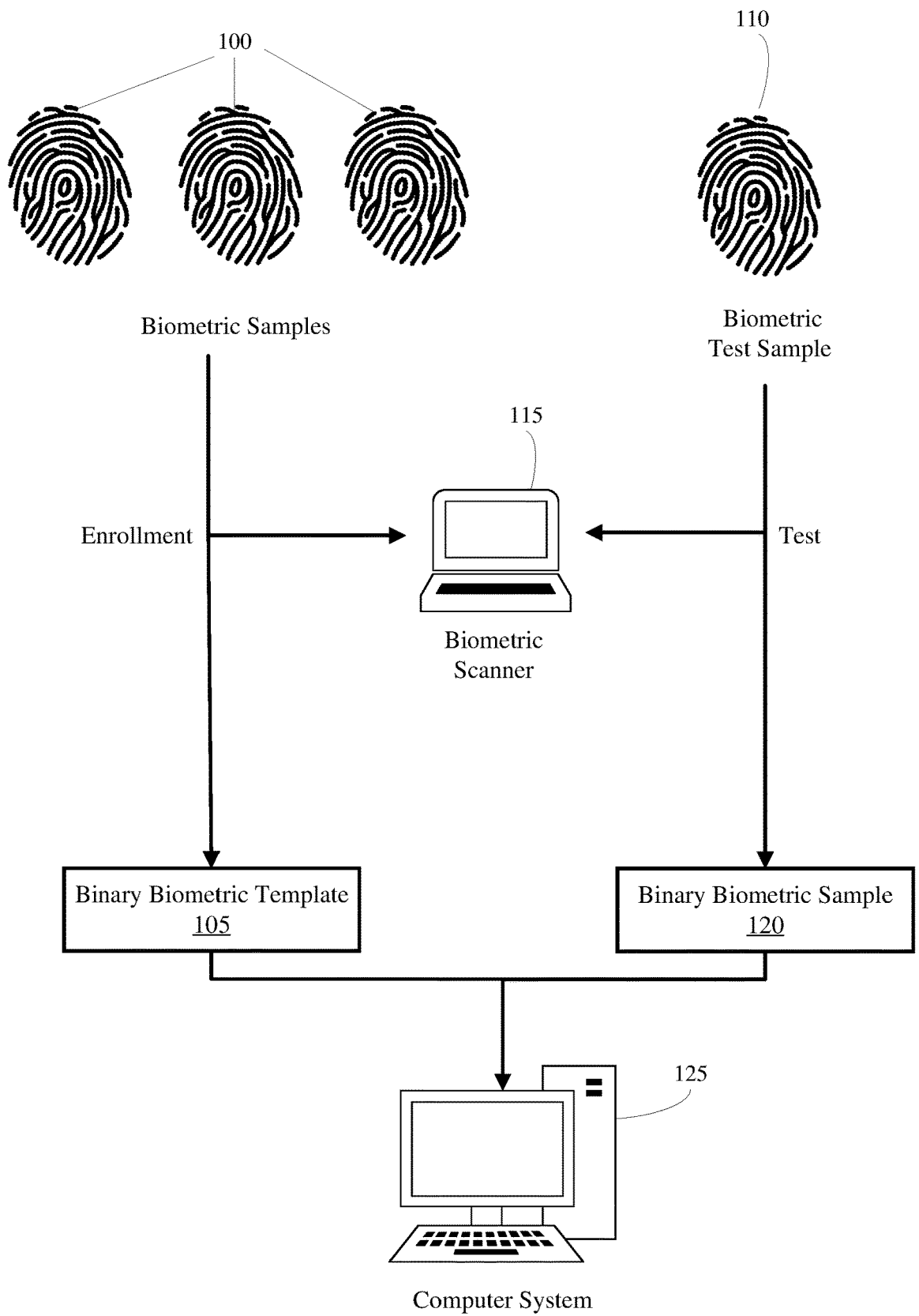
FIG. 1 is a diagram illustrating an example biometric authentication process, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of security, and in particular to securing biometric samples. While the present disclosure is not necessarily limited to such applications, various aspects of the disclosure may be appreciated through a discussion of various examples using this context.

Biometric authentication is a security protocol used to verify users using biological characteristics. Examples of biological characteristics that have been used in biometric authentication include iris patterns, fingerprints, hand shape, vein pattern, facial shape, DNA, blood, saliva, body odor, and voice tone/frequency. Biometric authentication is becoming increasingly popular due to the convenience and heightened security compared to passwords. For example, biometric authentication does not require meticulous organization and/or memorizing of passwords. Further, due to the heightened security requirements surrounding passwords (e.g., length requirements, alphanumeric character requirements, change frequency requirements), users commonly write passwords down, making them vulnerable to attack.

Though biometric authentication can be beneficial compared to passwords, biometrics face several challenges that passwords do not. The number of different "passwords" in biometric authentication are limited. For example, regarding fingerprinting, a given user can only register up to ten distinct samples (e.g., per finger). Similarly, regarding iris patterns, a user can only register up to two distinct iris samples (e.g., per eye). Accordingly, biometric sample data is precious, and if it is compromised, there is not an easy replacement. Further, storing encrypted representations (e.g., hashes) of biometric samples is not practical. This is because biometric samples vary. For example, two different fingerprint readings from the same user (on the same finger) are rarely identical due to positioning and/or pressure differences between readings.

Accordingly, hashing two different readings would likely produce two distinct hash representations. For this reason, biometric samples are typically configured into "templates." Templates are a collection (e.g., set) of readings for a given user obtained through an "enrollment process" in which a user presents several biometric readings. When authentication occurs, a user presents a new reading and a matching algorithm is applied to compare the new reading to the user's template. Templates are typically stored in explicit form unlike passwords. This poses a significant security challenge, as a template can be stolen from a user in an unencrypted form, whereas passwords are typically only stored in hashed representations.

In order to address this issue, a scheme known as "fuzzy commitment" can be used to provide "concealing" (e.g., it is infeasible for an attacker to learn the committed value) and "binding" (e.g., the value cannot be decommitted in more than one way) properties to biometric authentication. However, fuzzy commitment is counterintuitive to typical bit commitment schemes because it is tolerant to slight variability (e.g., error between readings). To attain concealing, binding, and variability tolerance properties, fuzzy commitment utilizes conventional bit commitment in combination with an error correcting code (ECC) framework.

In conventional bit commitment, a "sender" aims to conceal a bit b by encrypting the bit b to produce an encrypted representation y. The encrypted representation y is transmitted to a "receiver" over a channel. To commit the bit b, a function y=F (b, x) is used (where "F" is an encryption function of some sort). In this example, x is a witness used to conceal b. To decommit y, the sender is required to produce the witness x.

As an example, bit commitment can be analogized to locking a message in a safe. Assume that, Alice, a sender, conceals a message (e.g., a bit sequence) by locking it in a safe (e.g., a hash function) prior to sending it to Bob, a receiver. The safe can only be unlocked by using the correct combination (e.g., the witness). Accordingly, if Bob inputs the correct combination (e.g., produces the witness), he can unlock the safe to retrieve the message sent from Alice. The process is binding because Alice cannot change her message once it is put into the safe and concealing because Bob cannot determine the message without unlocking the safe via the correct combination.

In the biometric space, however, simple bit commitment is impractical, as there can be variability between each biometric sample. For example, assume a function y=F (k, x), where y is some committed value, F is the commitment function, k is a secret key, and x is a biometric sample. Unless the biometric sample x is an exact match, access to the secret key is not possible (and the data protected by the secret key cannot be accessed). Accordingly, an ECC framework is implemented such that the secret key k can be obtained by using some biometric sample x', where x' is sufficiently close to x such that the key k can be accessed.

To understand how to add error tolerance to the bit commitment scheme, reference will now be made to an example implementing error correcting code. Assume Alice, a sender, wants to send a message m to Bob, but the message is being transmitted over a noisy channel (e.g., in which the message is prone to potential errors). To allow the message m to be transmitted to Bob over the noisy channel, m can be mapped to a longer string c, in which c contains redundant elements (e.g., a repetition code) of the message m. As an example, if Alice sends the message "Hi" over the noisy channel, in an example where c includes 2 redundant elements of m, the message would be converted into "HHHiii" prior to transmission over the channel. Accordingly, if the message arrives as "HGHiji" (due to corruption over the noisy channel), Bob would be able to apply the error correcting code decoding function to convert "HGHiji" back to "Hi" (e.g., by mapping "HGHiji" to the nearest codeword in the ECC framework). In this example, the predominantly occurring characters in each triple set allow the corrupted encoded version (e.g., "HGHiji") to be mapped to the nearest codeword (e.g., "HHHiii") in the ECC framework and decoded back into the message "Hi".

As another example, if Alice sends a bit of binary code (010), the error correcting code encoding function would translate the bit string into (000111000). Accordingly, as long as at least two of the binary digits remain unflipped for each set of three bits corresponding to the original message, the longer string c can be converted back into the original message m. This example illustrates an error tolerance of 1 bit (e.g., if 2 bits in the same triple set flip, the message will be decoded improperly).

An error correcting code framework consist of a set of codewords C to which messages are mapped prior to transmission (e.g., following the example above, codewords could include (111111111), (000111000), (111000111), (000000000), etc.). Upon applying an error correcting code, a message is "encoded" using the ECC scheme, mapping the message to a particular codeword (e.g., (010) is mapped to (000111000)). When the encoded version of the message (e.g., 000111000) is transmitted over a noisy channel, the encoded message can be "corrupted" (e.g., when bits flip). The output over the noisy channel is then "decoded" by applying the ECC framework. This essentially maps the output to the nearest codeword (e.g., in terms of hamming distance) of the set C and converts it back into a non-redundant form. In this example, if the encoded version of (010) (e.g., (000111000)) is corrupted to (010111001) (e.g., 2 bits flip), when the corrupted codeword is decoded, it will be matched to the nearest codeword in the set C (e.g., (000111000)) and then reverted back to the original message (010).

This technique can be used to permit error tolerance in biometric authentication. Even if a biometric template (e.g., the witness required to decommit the bits and retrieve the secret key) and a biometric sample vary, as long as a presented biometric sample (e.g., during test time) can be mapped to the same codeword as the original biometric template, the biometric sample can be matched to the biometric template. The codeword the biometric sample is mapped to can then be used to "unlock" the encryption function in order to validate/verify a user. Security is still maintained however, and if the biometric sample varies significantly from the biometric template, the sample will be mapped to a different codeword, and consequently, the function will remain locked.

Referring now to the figures, FIG. 1 is a diagram illustrating an example biometric verification process, in accordance with embodiments of the present disclosure. One or more biometric samples 100 can be collected during an enrollment process. The biometric samples 100 can be collected via a biometric scanner 115. Any suitable biometric features can be used, including fingerprints, voices, facial structures, iris patterns, etc. The biometric scanner 115 used to collect the biometric samples 100 depends on the type of biometric feature (e.g., for voice recognition, a microphone is integrated into the biometric scanner 115 whereas for fingerprinting, the biometric scanner 115 is a fingerprint scanner). The biometric samples 100 are then used to generate a binary biometric template 105. That is, the biometric samples are collectively converted into a binary representation to be used to validate a user sometime in the future.

At a later time, the user presents a biometric test sample 110 to the biometric scanner. The biometric test sample 110 is converted into a binary biometric sample 120. Both the binary biometric template 105 and the binary biometric sample 120 are input into a computer system 125. The computer system 125 can then analyze the biometric template 105 and biometric sample 120 to determine whether there is a match (e.g., via minutiae comparison in a fuzzy commitment framework). If there is a match, the user can be validated, and access can be granted to one or more computer resources. If there is not a match (e.g., the matching fails), access is denied (e.g., the biometric sample is invalidated). In some instances, the user can be prompted to re-input another biometric sample, in case there was reading error (e.g., due to the scanner 115 or user).

In embodiments, the biometric scanner 115 and computer system 125 can be stand-alone. In these embodiments, the scanner 115 and computer system 125 can be communicatively coupled in any suitable manner (e.g., wirelessly via the internet or hard wired via Ethernet). In some embodiments, the biometric scanner 115 and computer system 125 can be integrated into a single machine (e.g., as a part of a laptop computer, smart phone, desktop computer, and the like).

Figure 2A:
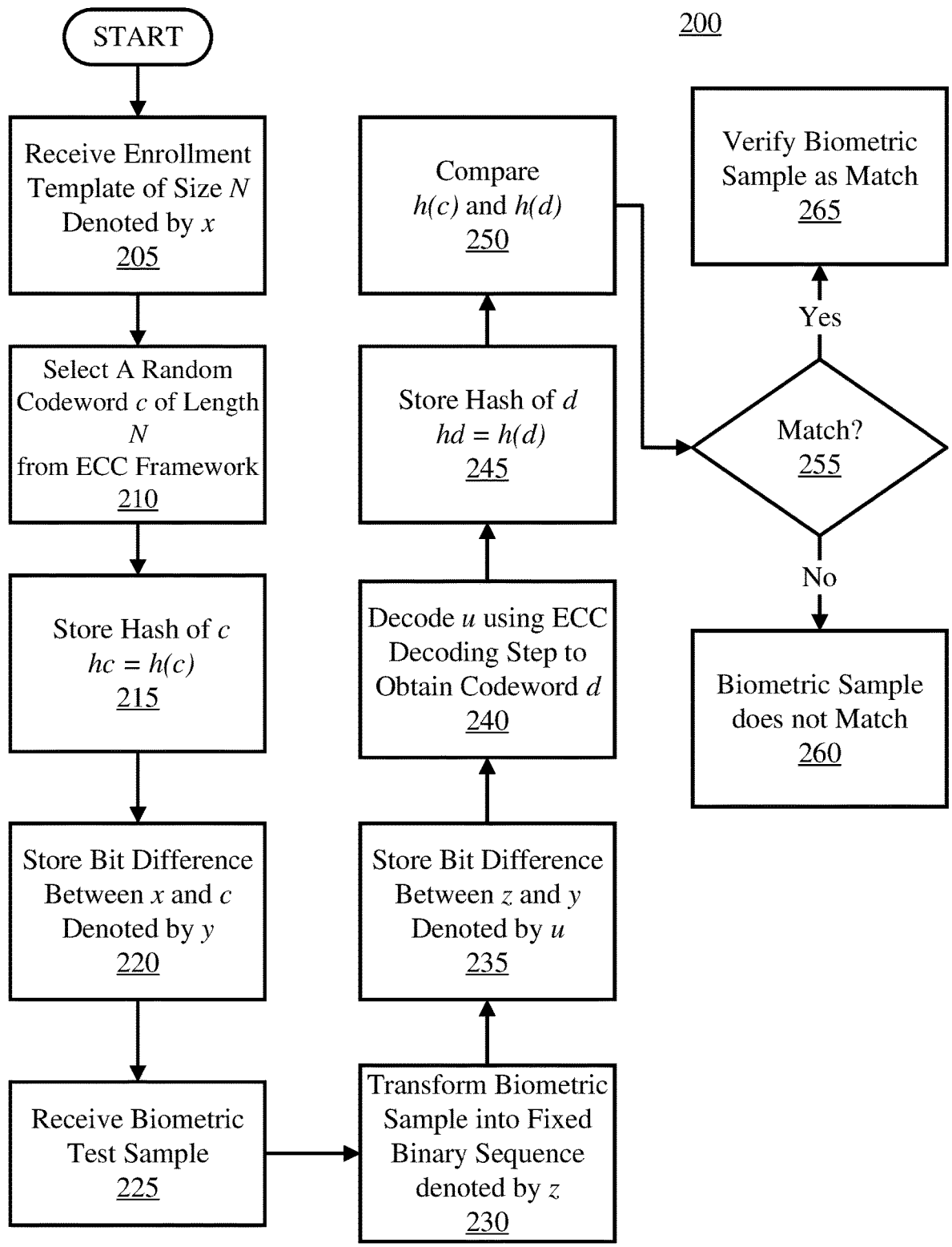
FIG. 2A is a flow-diagram illustrating a process for authenticating a user's biometric sample, in accordance with embodiments of the present disclosure.

FIG. 2A is a flow-diagram illustrating an example process 200 for validating a biometric sample presented by a user, in accordance with embodiments of the present disclosure.

Process 200 initiates where an enrollment template denoted by x of size N is received. This is illustrated at step 205. The enrollment template is a binary representation of one or more biological samples (e.g., biological samples 100 of FIG. 1) of a user. The binary representation x can have any suitable length N (e.g., 10 bits, 100 bits, 1000 bits, etc.).

The enrollment template can be generated by converting biometric samples (e.g., fingerprint grooves, voice recording, facial appearance, etc.) into binary representations. In embodiments, converting biometric samples into a binary representations can be completed using machine learning (e.g., deep learning) algorithms. For example, biometric samples can be converted into binary representations by generating an n-dimension feature vector for a given biometric sample and comparing the feature vector to an ordered set of hyperplanes. Based on the relative position of the feature vector with respect to each hyperplane, binarization can be completed. For example, if the feature vector falls on the negative side of a given hyperplane, a bit value of 0 is assigned to the biometric sample with respect to that hyperplane. Alternatively, if the feature vector falls on the positive side of the hyperplane, a bit value of 1 is assigned to the biometric sample. The ordered set of bits corresponding to the ordered set of hyperplanes construct the binary representation.

In some embodiments, the enrollment template includes multiple readings of the same biological feature (e.g., five fingerprint readings from the same finger). In these embodiments, the multiple readings can be collectively considered (e.g., averaged) when generating the template. In some embodiments, the template is generated using one or more minutiae of a biological sample (e.g., particular grooves in a finger print, tones of a voice, lines in an iris, etc.). In these embodiments, minutiae of a biological template can be compared to a biological sample.

A codeword c of the length N is then selected randomly from an error correcting code (ECC) framework. This is illustrated at step 210. As referenced above, an error correcting code framework comprises a plurality of codewords to which inputs are mapped. When encoding a particular input, the input is mapped to the codeword and transmitted (e.g., via a translation function). The output (e.g., after transmission, which may be the same codeword or a corrupted version thereof) is then decoded by mapping the output to the nearest codeword in the ECC framework. The codeword c can be randomly selected in any manner. For example, each possible codeword (e.g., which can include $10^{30}$-$10^{50}$ codewords) can be assigned a position, and a random number generator can be used to randomly select a position (e.g., and thus a codeword).

The selected ECC framework depends on error tolerance (e.g., false positive and false negative acceptance) and security. An ECC framework with more codewords provides enhanced security (e.g., as a brute force hacker would have to guess more codewords in order to crack the algorithm). An ECC framework with less codewords provides greater flexibility, allowing for more variation between the biological template and the biological test sample. Accordingly, selecting the proper ECC framework can be based on a tradeoff between error tolerance and security.

A hash of the codeword c is then generated. This is illustrated at step 215. The hash can be generated by inputting the codeword c into a cryptographic hash function (e.g., SHA-1, SHA-256, HAVAL, JH, MD5, Skein, Snefru, Spectral Hash, etc.). The hash representation h(c) can then be stored for use at a later time in any suitable memory (e.g., volatile memory (DRAM) or non-volatile memory (e.g., flash, 3DXP, tape, hard drive, solid state drive, etc.)).

A bit difference (e.g., exclusive or) denoted by y between the enrollment template x and the codeword c is then calculated and stored. This is illustrated at step 220. The bit difference can be calculated by an XOR operation (e.g., y=x XOR c), such that a zero in bit position k represents that bits in x and c in position k are identical, and a one in bit position k represents that bits in position k in x and c are different.

A biometric test sample is then received. This is illustrated at step 225. The biometric sample can be obtained via a biometric scanner (e.g., biometric scanner 115 of FIG. 1) configured to capture and store characteristics (in the same modality as done for enrollment) of a given biometric sample. The biometric test sample received from the biometric scanner can then be transformed into a binary sequence (in the same manner it is done in enrollment) denoted by z. This is illustrated at step 230.

In some embodiments, the test feature vector extracted from the biometric test sample is converted into a soft binary representation at step 230. In soft binarization, rather than converting the test sample into a binary representation (e.g., represented by bits), the sample is converted into a soft binary form having probabilistic bits. In conventional binarization, the biometric sample can be converted into an n-dimensional feature vector and compared, for example, to an unordered set of hyperplanes. Based on whether the feature vector falls on the negative or positive side of a given hyperplane, a binary value is stored.

However, this method does not account for the actual distance between the feature vector and the hyperplane, and merely concerns the direction the feature vector with respect to each hyperplane. For example, if a feature vector is positioned slightly on the negative side of a hyperplane (e.g., assigned a distance of −1) and a different feature vector is mapped slightly on the positive side of the same hyperplane (e.g., assigned a distance of +1), they will be assigned different bit values. Accordingly, soft binarization accounts for the magnitude of the feature vector with respect to a given hyperplanes, rather than solely the direction of each dimension with respect to the hyperplane. Following the example above, if a soft binarization algorithm is used, the assigned distance of −1 could be assigned soft binary value of 0.49 (e.g., a 49% chance of being a 1), while the assigned distance of +1 could be assigned a soft binary value of 0.51 (e.g., a 51% chance of being a 1). As another example, an assigned distance of +1000 could be assigned a soft binary value of 1 (100% chance of being 1).

In embodiments, to determine the probabilistic bits, a variability model built on training data can be used. The variability model can be built using a plurality of biological samples taken for a set of subjects denoted, which are the "training set". For each subject in the training set, multiple biometric samples are taken (such as multiple photos of their face). The biometric samples are processed using the same pipeline described above (feature vector extraction and binarization). A machine learning algorithm (such as a neural network on a multivariate covariance model) is then trained to map a given feature vector into a set of probabilities, one for each bit. Given two biometrics samples (a and b) from a single person and given a scoring function f_k (neural network, hyperplane projection, etc.) that maps a feature vector to a real value which is then binarized to produce bit position k, the corresponding bits are sign(f_j (a)) and sign(f_k(b)). A predictor such as a neural network nn_k could be trained to estimate the probability of sign (f_k(b)) to be equal to one given f_j(a). For instance, if f_j(a) is very negative, the probability is very small. The predictor would be trained from many pairs of such a and b from many subjects in the training set.

A bit difference denoted by u between the bit difference (between the biometric template x and the codeword c) y and the biometric sample z is then calculated and stored. This is illustrated at step 235. The bit difference u between y and z can similarly be calculated using an XOR operation (e.g., u=y XOR z). In this case we extend XOR to one hard-bit operand (y) and one soft-bit (z). Note that z is defined as the probability to be 1. In case of y=1, y XOR z is equal to z. In case of y=0, y XOR z is equal to (1−z).

The (soft) bit difference u is then decoded using the ECC framework (soft) decoding step to obtain a codeword d. This is illustrated at step 240. The ECC decoding step includes selecting the nearest codeword (e.g., in terms of hamming distance) to u. The ECC decoding step depends on the translation function used for encoding. For example, if a particular bit sequence (111) is encoded (via a translation function) into a codeword (111111) (e.g., an extra element of redundancy per bit), and a bit flip occurred resulting in (011111), then two potential codewords of the corrupted sequence could be mapped to include (001111) and (111111). This example illustrates an instance in which the ECC framework can detect, but not fix, errors, as there are two potential codewords which are equal in terms of hamming distance (e.g., both codewords are 1 bit apart from the corrupted sequence) from the sequence.

The codeword d is then hashed (e.g., using the same function as in step 215), and the hash is stored as h(d). This is illustrated at step 245. The hash of the codeword c, h(c), is then compared with the hash of the codeword d, h(d). This is illustrated at step 250. A determination is made whether the hashes of c and d match. This is illustrated at step 255. The determination can be completed by determining whether each hash is represented by the same value. If the hashes match, the user is verified, as the biometric sample z was sufficiently close to the biometric template x to decommit the encryption (e.g., and obtain a secret key or other protected data). This is illustrated at step 265. In response to verifying the user, access can be granted to one or more computing resources (e.g., accounts, networks, machines, etc.). This can be completed by revealing a secret key to the user in response to the validation, such that the secret key can be used to decrypt one or more algorithms. If the hashes do not match, then a determination is made that the biometric sample does not match. This is illustrated at step 260. In some embodiments, if a determination is made that h(c) and h(d) do not match, the process 200 proceeds to step 270 of FIG. 2B.

Figure 2B:
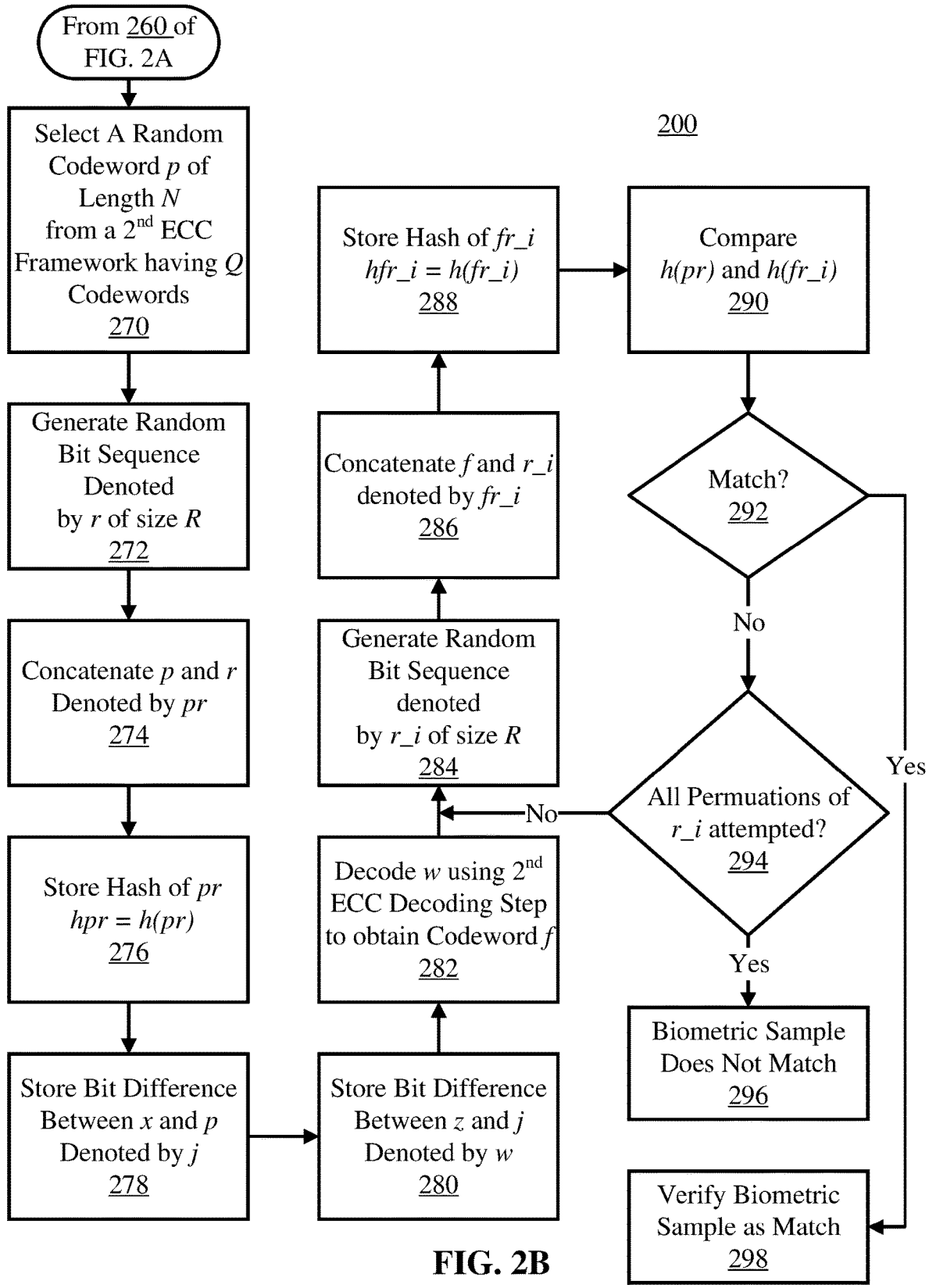
FIG. 2B is a flow-diagram illustrating an extension of the process of FIG. 2A including a second security technique, in accordance with embodiments of the present disclosure.

Referring now to FIG. 2B, shown is a flow-diagram illustrating an extension of process 200 implementing a second security technique with a second ECC framework, in accordance with embodiments of the present disclosure. The second security technique can be used as a second attempt to verify the user using a second ECC framework. Specifically, the first ECC framework (e.g., as step 210) may not account for the variability inherent in biometric authentication. By including more codewords in the set M of the first ECC framework, the distance between any two codewords is less, which leads to greater security but less error tolerance. Accordingly, FIG. 2B illustrates a flow-diagram where, if the user was not verified using the first ECC framework, a second ECC framework with Q codewords is applied, where Q is less than M. Though fewer codewords reduces security (e.g., making brute-force attacks easier), security can still be maintained when using the second security technique. This is because the second security technique integrates a security multiplier, to be discussed below.

Process 200 initiates where a codeword p of length N is selected from the second ECC framework having Q codewords. This is illustrated at step 270. The codeword p can be randomly selected in a similar manner to step 210 of FIG. 2A. However, the pool of codewords Q is smaller than the pool of codewords M. This increases the hamming distance between any two codewords, thereby increasing the error tolerance of the validation technique. This is beneficial in situations where a user's biometric sample varies from the biometric template. For example, if a facial recognition biometric template was collected from a user with a beard, and the user attempts to verify himself after shaving, there can be significant variation between the template and the sample. Accordingly, using an ECC framework with higher error tolerance may permit proper validation where a user's biometric sample differs from the user's biometric template.

A random bit sequence denoted by r of size R is then generated. This is illustrated at step 272. The codeword p selected from the second ECC framework and the random bit sequence r are then concatenated, generating pr. This is illustrated at step 274. For example, if the codeword p is (00100) and the bit sequence r is (111), the concatenation of p and r would be (00100111). The concatenation pr is then hashed, and the hashed representation h(pr) is stored. This is illustrated at step 276. The hash can be generated using any suitable cryptographic hash function, such as those described with respect to step 215 of FIG. 2A.

A bit difference between the template x and the codeword p is then stored, denoted by j. This is illustrated at step 278. The bit difference can be calculated by using an XOR operation (e.g., j=x XOR p). A bit difference can then be similarly calculated between the biometric sample z and the bit difference j, denoted by w (e.g., w=z XOR j). This is illustrated at step 280.

The bit difference w is then decoded using the second ECC decoding step to select the nearest codeword in terms of hamming distance. This is illustrated at step 282. The codeword f is then selected as the nearest codeword.

A random bit sequence denoted by r_i of size R is then generated. This is illustrated at step 284. The codeword f and the random bit sequence r_i of size R are then concatenated to generate a concatenated representation fr_i. This is illustrated at step 286. The concatenated representation fr_i is then hashed. The hashed representation h(fr_i) is then stored. This is illustrated at step 288. The hashes h(pr) and h(fr_i) are then compared. This is illustrated at step 290. A determination is made whether the hashes match (e.g., whether the hash values are identical). This is illustrated at step 292. If the hashes are identical, the biometric sample is verified as a match, and access to one or more resources can be granted. This is illustrated at step 298. If the hashes h(pr)

and h(fr_i) do not match, a determination is made whether all permutations of the binary sequence r_i are attempted. This is illustrated at step 294. If all permutations of r_i have not been attempted, another random bit sequence r_i is generated (e.g., a different permutation of the bit sequence of length R). If all permutations of r_i have been attempted, then a determination is made that the biometric sample does not match the biometric template. This is illustrated at step 296. The user can then be denied access (e.g., prevented from logging into a website, accessing a database, logging into an account, etc.).

By adding a random bit sequence r to the codeword p prior to hashing, the authentication runtime is multiplied (e.g., using a first security multiplier). Based on the length R of the random bit sequence r, more guesses of r_i (e.g., which is a random bit sequence of the same length R) are completed before a match occurs (e.g., at step 284). For example, if a random bit sequence with a size of 5 bits is selected as (01100), $2^5$ guesses are required before the bit sequence (01100) is guaranteed to be attempted. If the proper bit sequence is not selected at step 294, then each other permutation is guessed, in turn, at step 284. When all permutations of r_i have been attempted, if there still is not a match, a determination is made that the biological sample is not verified as the user at step 296.

Though the run-time of authentication is increased by adding a random bit string prior to hashing, the time required for a brute-force attack is multiplied by the same factor. For example, if authentication typically takes 0.1 microseconds, and the authentication runtime is increased by a factor of 1,000 as a result of being required to guess each permutation of r_i of size R, then the time required for authentication would increase to 0.1 milliseconds. Similarly, if the time required to brute force crack (e.g., to guess the correct codeword in the ECC framework) the algorithm takes 1 day, and the time required for brute force cracking increases by a factor of 1,000 as a result of having to guess each permutation of r_i, then the time required to brute-force crack the algorithm would increase to 1,000 days. This solution can increase the amount of time required for authentication and brute-force cracking. However, the time required for authentication can remain reasonable, while the time required for brute-force cracking can become infeasible. Further, by adding a time-multiplier to the second ECC framework with less codewords in the pool Q, security can still be maintained though there are less codewords for a brute force attacker to guess.

Figure 3:
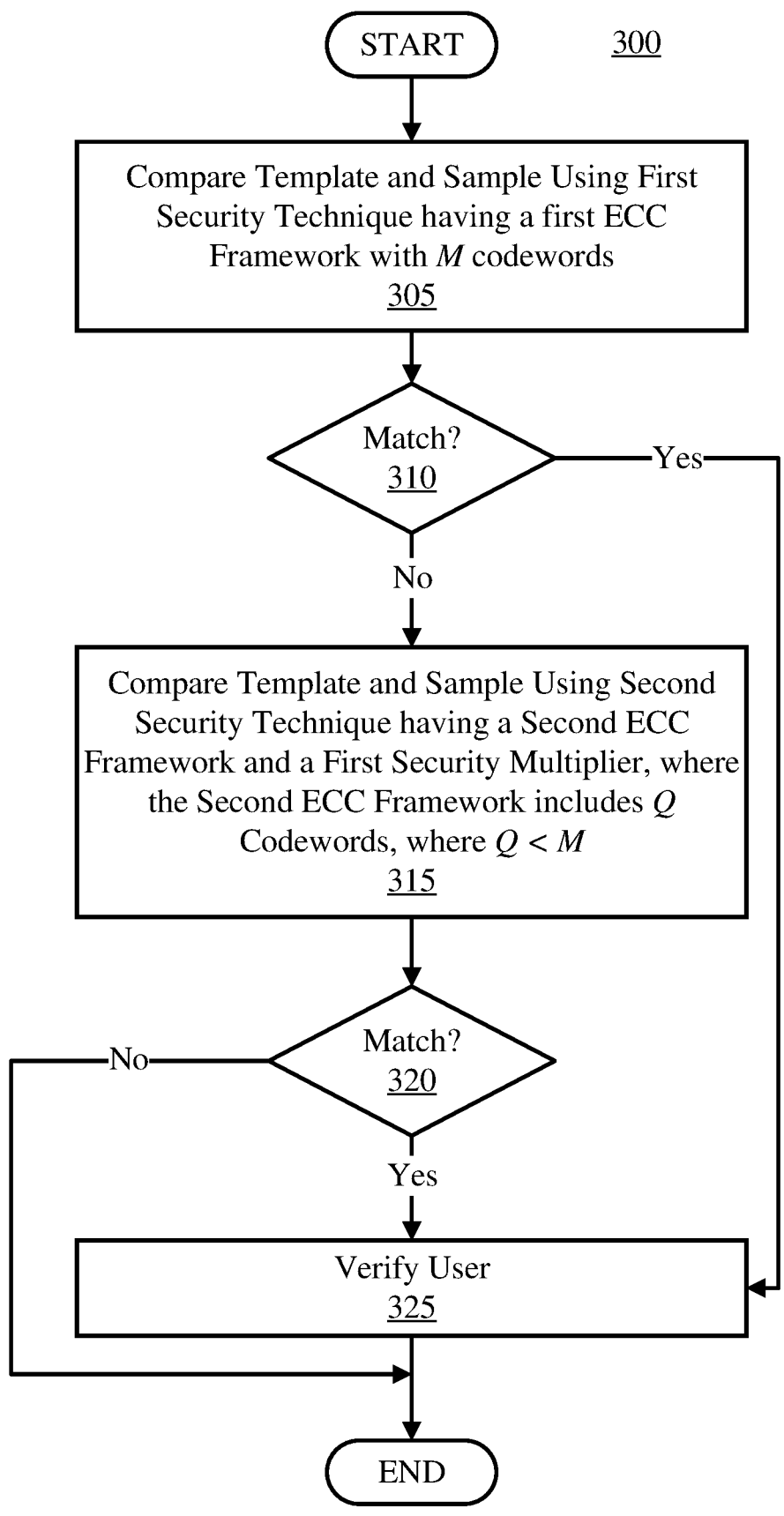
FIG. 3 is a high-level flow-diagram illustrating a biometric authentication protocol implementing two security techniques, in accordance with embodiments of the present disclosure.

Referring now to FIG. 3, shown is a flow-diagram of a process 300 for biometric authentication of a user via two security techniques, in accordance with embodiments of the present disclosure. Process 300 initiates where a user template and a user sample are compared using a first security technique including a first ECC framework with M codewords. This is illustrated at step 305. In embodiments, the comparison at step 305 can be completed in the manner depicted in FIG. 2A. Based on the comparison with the first ECC framework, a determination is made whether the sample and template match (e.g., step 255 of FIG. 1). This is illustrated at step 310. If the template and sample match, the user is verified. This is illustrated at step 325.

If a determination is made that the template and sample do not match, the template and sample are compared using a second security technique including a second ECC framework and a first security multiplier. This is illustrated at step 315. The second ECC framework includes Q codewords, where Q<M. A determination is then made whether there is a match between the biometric template and biometric sample (e.g., whether the hashes of the codewords match). This is illustrated at step 320. If there is a match, the user is verified. This is illustrated at step 325. If there is not a match, then process 300 ends, and the user can be denied access.

Increasing the number of codewords enhances the security of the system by increasing the number of attempts (e.g., guesses) needed by a brute force hacker. However, increasing the number of codewords decreases the error tolerance between the biometric template and biometric sample, as the distance (e.g., hamming distance) between codewords decreases. Accordingly, by verifying the user via two security techniques with two respective ECC frameworks, both security and error tolerance benefits are attained.

Further, by adding a security multiplier to the second security technique, even if there are significantly fewer codewords in the second ECC framework, security can still be maintained by artificially enhancing the security. In some embodiments, the security multiplier can be substantially similar to the security multiplier described with respect to FIG. 2B (e.g., by adding a random bit sequence prior to hashing, and during test time, guessing every permutation of the random bit sequence until a match occurs). In some embodiments, the security multiplier can include running multiple hashes on each respective codeword. For example, each codeword (e.g., codeword c and codeword d of FIG. 2A) can be hashed hundreds of times in sequence via distinct cryptographic hash functions (e.g., the security multiplier includes key-stretching). In these embodiments, the stretched hash representations can be compared to determine whether there is a match. This method similarly multiplies the runtime of the authentication method. However, brute force cracking is multiplied by the same factor. By determining an optimal time multiplier, the time taken for authentication can remain reasonable, while the time required for a brute-force crack can become infeasible.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
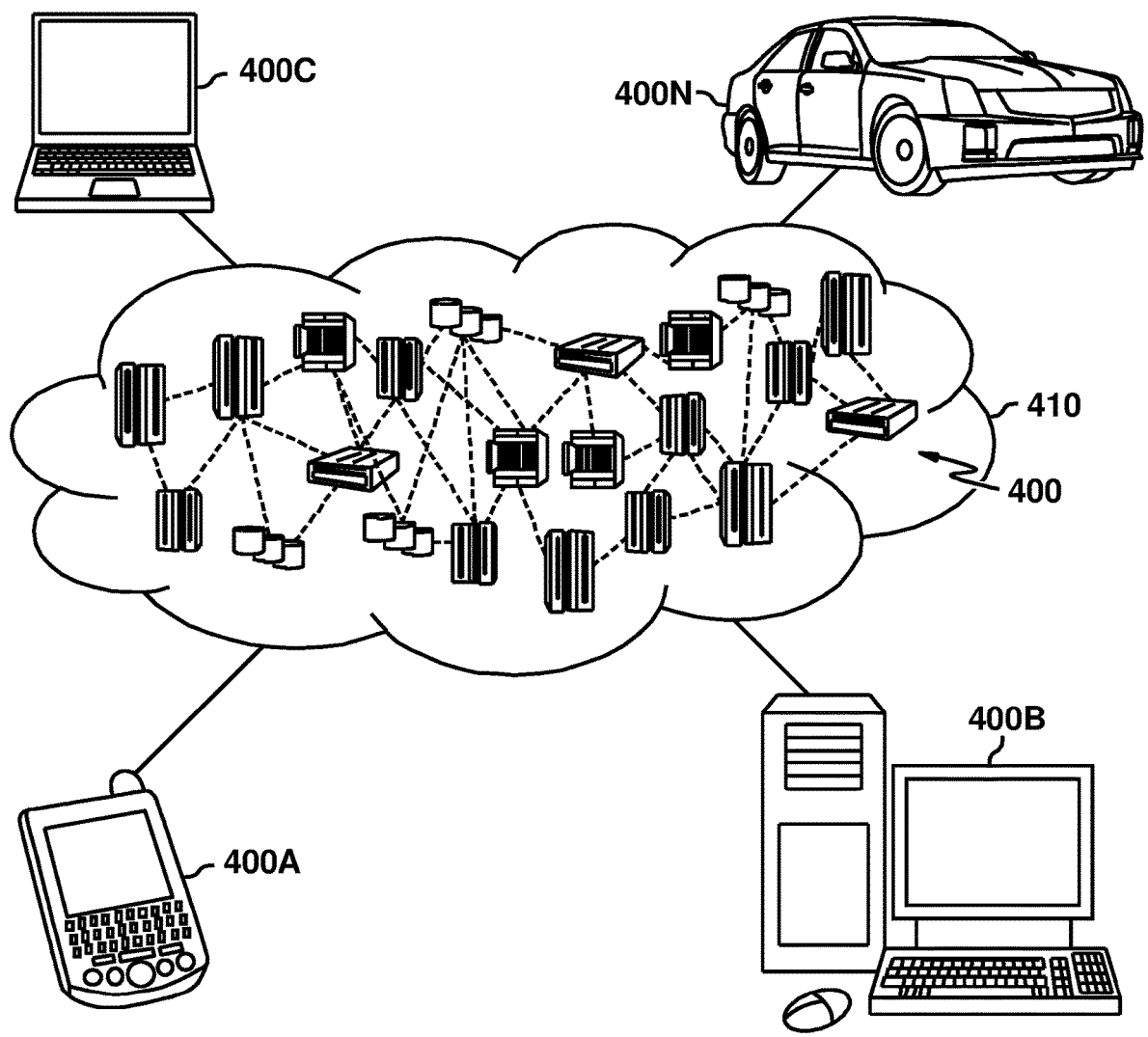
FIG. 4 is a diagram illustrating a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A (e.g., biometric scanner 115, computer system 125), desktop computer 400B (e.g., biometric scanner 115, computer system 125) laptop computer 400C (e.g., biometric scanner 115, computer system 125), and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
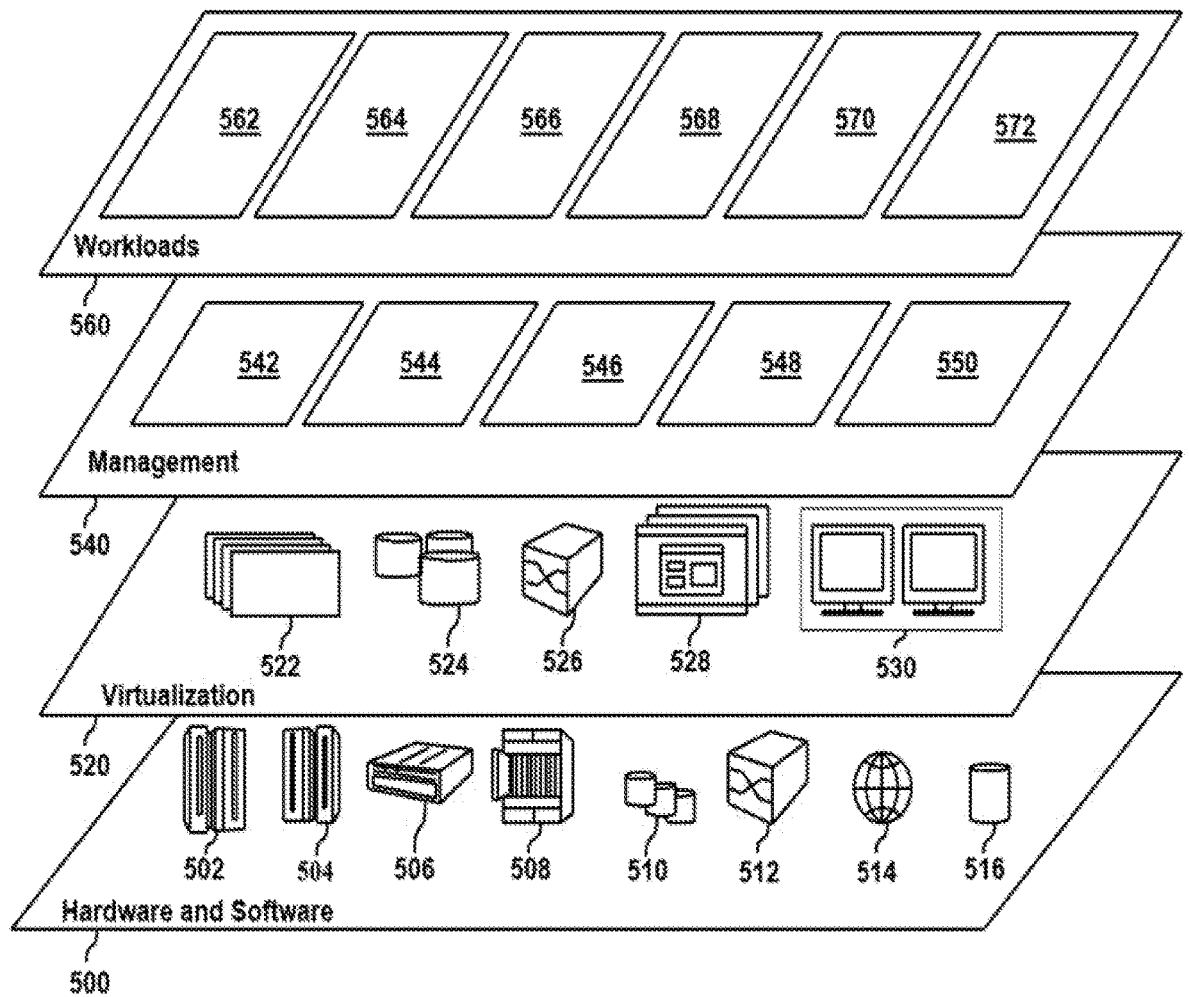
FIG. 5 is a block diagram illustrating abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the disclosure are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. For example, resource provisioning 542 may obtain a suitable number of processing devices to process static sensor data. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service level management 548 may allocate suitable processing power and memory to process static sensor data.

Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; biometric data processing 566; data analytics processing 568; transaction processing 570; and security enhancement 572.

Figure 6:
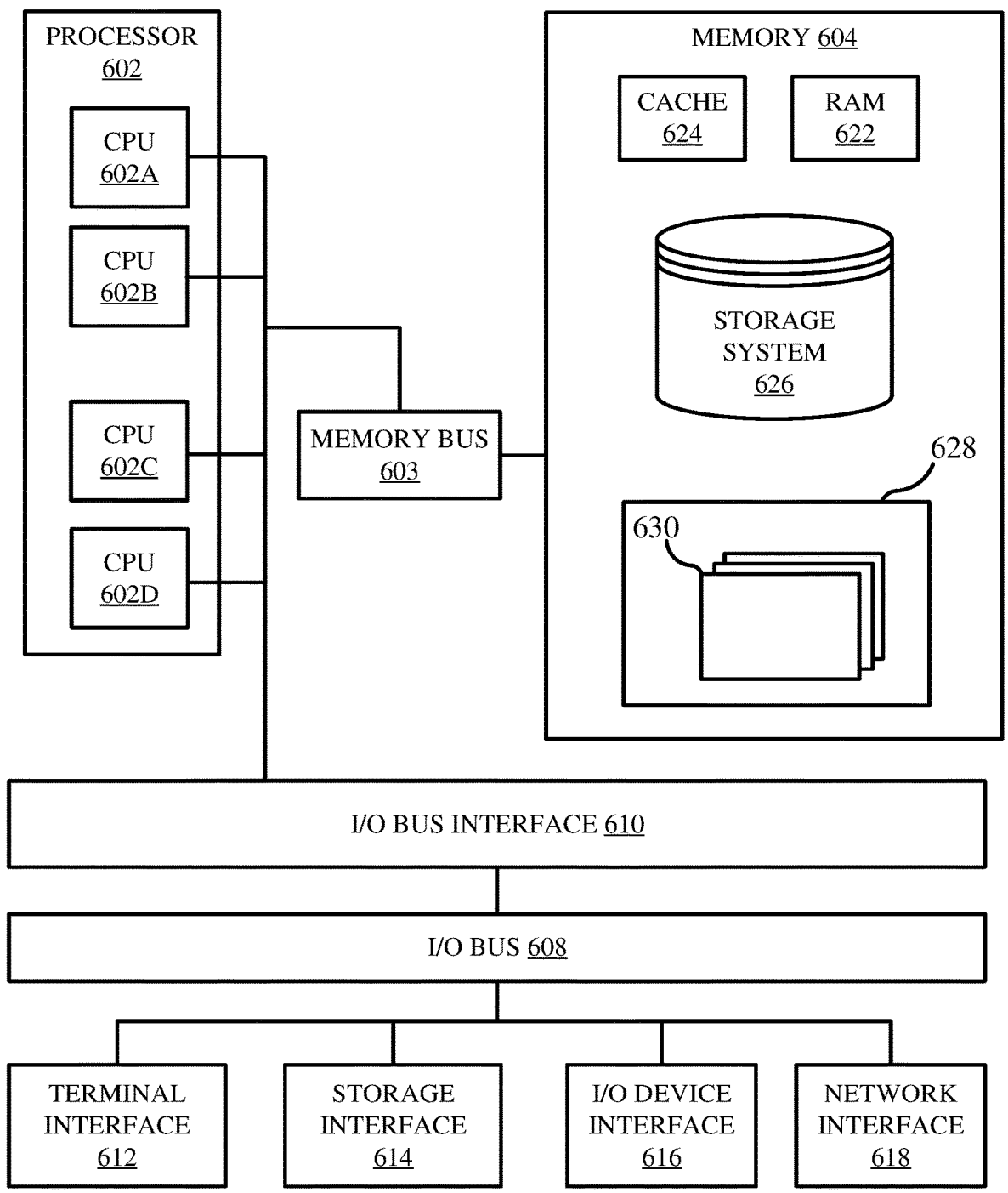
FIG. 6 is a high-level block diagram illustrating an example computer system that may be used in implementing one or more of the methods, tools, and modules, and any related functions, described herein, in accordance with embodiments of the present disclosure.

Referring now to FIG. 6, shown is a high-level block diagram of an example computer system 601 (e.g., biometric scanner 115, computer system 125) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

In some embodiments, the program modules 630 of the computer system 601 may include a biometric security module. The biometric security module can be configured to compare a biometric template and a biometric sample using a first security technique having a first ECC framework with a first number of codewords. The biometric security module can be configured to determine that the biometric template and biometric sample do not match using the first security technique. The biometric security module can be configured to compare the biometric template and the biometric sample using a second security technique having a second ECC framework with a second number of codeword, the second number of codewords less than the first number of codewords. The biometric security module can then be configured to determine that the biometric template and the biometric sample match, and a user associated with the biometric sample can be verified.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system comprising:
a memory storing program instructions; and
a processor, wherein the processor is configured to execute the program instructions to perform a method comprising:
comparing a biometric template and a biometric sample using a first security technique, the first security technique having a first error correcting code (ECC) framework with a first number of codewords, wherein comparing the biometric template and the biometric sample using the first security technique includes:
receiving the biometric template represented by a binary sequence with a first bit length; and
selecting a first codeword of the first bit length from the first number of codewords of the first ECC framework, each codeword of the first number of codewords mapping to input binary sequences having the first bit length;
determining that the biometric template and the biometric sample do not match using the first security technique;
comparing, in response to determining that the biometric template and the biometric sample do not match using the first security technique, the biometric template and the biometric sample using a second security technique, the second security technique having a second ECC framework with a second number of codewords, where the second number of codewords is less than the first number of codewords;
determining that the biometric template and the biometric sample match using the second security technique; and
validating a user associated with the biometric sample.

2. The system of claim 1, wherein, after the selecting, comparing the biometric template and the biometric sample using the first security technique having the first ECC framework includes:
generating a random binary sequence having a second bit length;
concatenating the first codeword of the first bit length with the random binary sequence having the second bit length to generate a concatenated representation;
hashing the concatenated representation to generate a first hash representation;
storing a first bit difference between the biometric template and the selected codeword;
receiving, during a test time, the biometric sample from the user, the biometric sample represented by a binary sequence with the first bit length;
storing a second bit difference between the biometric sample and the first bit difference;
decoding the second bit difference, using the first ECC framework, by selecting a second codeword, the second codeword being nearest in terms of bit distance to the second bit difference;
concatenating the second codeword with a random bit binary sequence having the second bit length to generate a second concatenated representation;
hashing the second concatenated representation to generate a second hash representation; and
comparing the first hash representation and the second hash representation.

3. The system of claim 2, wherein determining that the biometric template and the biometric sample do not match using the first security technique includes:
determining that the first hash representation and the second hash representation do not match.

4. The system of claim 3, wherein, in response to determining that the first hash representation and the second hash representation do not match, each other bit permutation of the binary sequence having the second bit length is attempted, where if each attempt fails, the biometric sample is invalidated using the first security technique.

5. The system of claim 1, wherein, when comparing the biometric template and biometric sample using the second security technique having the second ECC framework, the biometric sample is soft binarized and compared to the biometric template.

6. The system of claim 1, wherein the second security technique includes a first security multiplier.

7. The system of claim 6, wherein the first security multiplier includes key-stretching.

8. A method comprising:
comparing a biometric template and a biometric sample using a first security technique, the first security technique having a first error correcting code (ECC) framework with a first number of codewords, wherein comparing the biometric template and the biometric sample using the first security technique includes:
    receiving the biometric template represented by a binary sequence with a first bit length; and
    selecting a first codeword of the first bit length from the first number of codewords of the first ECC framework, each codeword of the first number of codewords mapping to input binary sequences having the first bit length;
determining that the biometric template and the biometric sample do not match using the first security technique;
comparing, in response to determining that the biometric template and the biometric sample do not match using the first security technique, the biometric template and the biometric sample using a second security technique, the second security technique having a second ECC framework with a second number of codewords, where the second number of codewords is less than the first number of codewords;
determining that the biometric template and the biometric sample match using the second security technique; and
validating a user associated with the biometric sample.

9. The method of claim 8, wherein, after the selecting, comparing the biometric template and the biometric sample using the first security technique having the first error correcting code (ECC) framework includes:
    generating a random binary sequence having a second bit length;
    concatenating the first codeword of the first bit length with the random binary sequence having the second bit length to generate a concatenated representation;
    hashing the concatenated representation to generate a first hash representation;
    storing a first bit difference between the biometric template and the selected codeword;
    receiving, during a test time, the biometric sample from the user, the biometric sample represented by a binary sequence with the first bit length;
    storing a second bit difference between the biometric sample and the first bit difference;
    decoding the second bit difference, using the first ECC framework, by selecting a second codeword, the second codeword being nearest in terms of bit distance to the second bit difference;
    concatenating the second codeword with a random bit binary sequence having the second bit length to generate a second concatenated representation;
    hashing the second concatenated representation to generate a second hash representation; and
    comparing the first hash representation and the second hash representation.

10. The method of claim 9, wherein determining that the biometric template and the biometric sample do not match using the first security technique includes:
    determining that the first hash representation and the second hash representation do not match.

11. The method of claim 10, wherein, in response to determining that the first hash representation and the second hash representation do not match, each other bit permutation of the binary sequence having the second bit length is attempted, where if each attempt fails, the biometric sample is invalidated using the first security technique.

12. The method of claim 8, wherein, when comparing the biometric template and biometric sample using the second security technique having the second ECC framework, the biometric sample is soft binarized and compared to the biometric template.

13. The method of claim 8, wherein the second security technique includes a first security multiplier.

14. The method of claim 13, wherein the first security multiplier includes key-stretching.

15. A computer program product comprising a computer readable storage medium having program instructions embodied therewith, wherein the computer readable storage medium is not a transitory signal per se, the program instructions executable by a processor to cause the processor to perform a method comprising:
    comparing a biometric template and a biometric sample using a first security technique, the first security technique having a first error correcting code (ECC) framework with a first number of codewords, wherein comparing the biometric template and the biometric sample using the first security technique includes:
        receiving the biometric template represented by a binary sequence with a first bit length; and
        selecting a first codeword of the first bit length from the first number of codewords of the first ECC framework, each codeword of the first number of codewords mapping to input binary sequences having the first bit length;
    determining that the biometric template and the biometric sample do not match using the first security technique;
    comparing, in response to determining that the biometric template and the biometric sample do not match using the first security technique, the biometric template and the biometric sample using a second security technique, the second security technique having a second ECC framework with a second number of codewords, where the second number of codewords is less than the first number of codewords;
    determining that the biometric template and the biometric sample match using the second security technique; and
    validating a user associated with the biometric sample.

16. The computer program product of claim 15, wherein, after the selecting, comparing the biometric template and the biometric sample using the first security technique having the first error correcting code (ECC) framework includes:
    generating a random binary sequence having a second bit length;
    concatenating the first codeword of the first bit length with the random binary sequence having the second bit length to generate a concatenated representation;
    hashing the concatenated representation to generate a first hash representation;
    storing a first bit difference between the biometric template and the selected codeword;
    receiving, during a test time, the biometric sample from the user, the biometric sample represented by a binary sequence with the first bit length;
    storing a second bit difference between the biometric sample and the first bit difference;
    decoding the second bit difference, using the first ECC framework, by selecting a second codeword, the second codeword being nearest in terms of bit distance to the second bit difference;
    concatenating the second codeword with a random bit binary sequence having the second bit length to generate a second concatenated representation;
    hashing the second concatenated representation to generate a second hash representation; and comparing the first hash representation and the second hash representation.

17. The computer program product of claim 16, wherein determining that the biometric template and the biometric sample do not match using the first security technique includes:
   determining that the first hash representation and the second hash representation do not match.

18. The computer program product of claim 17, wherein, in response to determining that the first hash representation and the second hash representation do not match, each other bit permutation of the binary sequence having the second bit length is attempted, where if each attempt fails, the biometric sample is invalidated using the first security technique.

19. The computer program product of claim 15, wherein, when comparing the biometric template and biometric sample using the second security technique having the second ECC framework, the biometric sample is soft binarized and compared to the biometric template.

20. The computer program product of claim 15, wherein the second security technique includes a first security multiplier.

* * * * *